United States Patent Office.

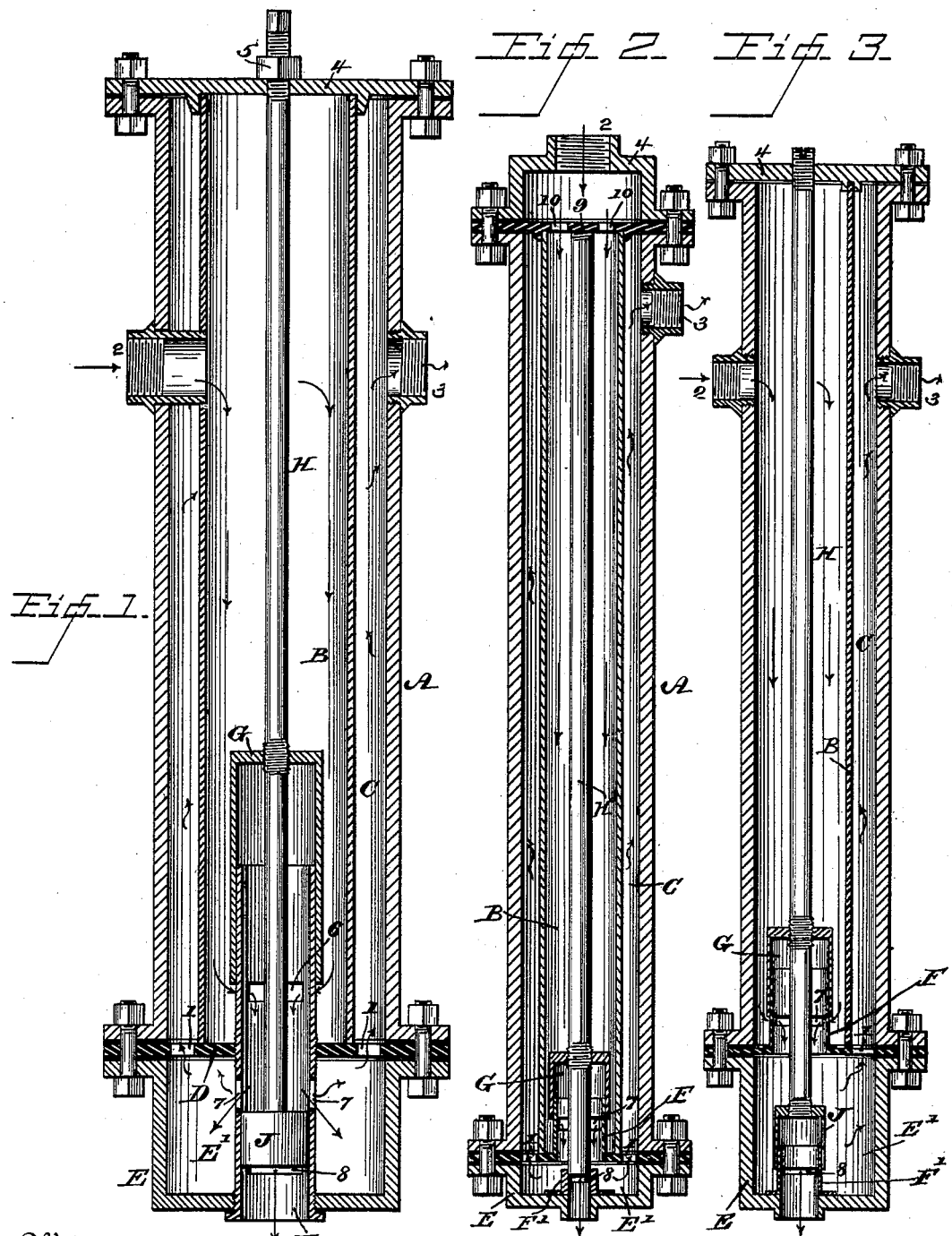

CHARLES CORNWELL, OF PHILADELPHIA, PENNSYLVANIA, ASSIGNOR OF ONE-HALF TO HENRY C. DUNLAP, OF SAME PLACE.

STEAM-TRAP.

SPECIFICATION forming part of Letters Patent No. 406,264, dated July 2, 1889.

Application filed January 24, 1889. Serial No. 297,382. (No model.)

*To all whom it may concern:*

Be it known that I, CHARLES CORNWELL, a citizen of the United States, residing in the city of Philadelphia, in the State of Pennsylvania, have invented certain new and useful Improvements in Steam-Traps, of which the following is a full, clear, and exact description, reference being had to the accompanying drawings, forming a part of this specification.

My invention consists of a steam-trap embodying novel features, as will be hereinafter fully set forth and definitely claimed.

Figure 1 represents a vertical section of a steam-trap embodying my invention. Figs. 2 and 3 represent vertical sections of modifications on reduced scales.

Similar letters and numerals of reference indicate corresponding parts in the several figures.

Referring to the drawings, A, Fig. 1, designates the outer cylinder or casing of a steam-trap, and B designates an inner cylinder or casing, forming the chamber C between the two cylinders.

D designates a transversely-extending diaphragm or partition, which is secured to the bottom of the cylinder A and to the cylinder E below the same, said cylinder forming the chamber E', the lower end of the cylinder B being connected with said diaphragm.

In the diaphragm D are ports 11, which form communication between the chambers C E.

Connected with the cylinder B, passing transversely through the cylinder A, is an induction-pipe 2, and connected with cylinder A is an eduction-pipe 3. Within cylinder B is a cylinder F, which passes through the partition D and base of the cylinder E and opens to the atmosphere at said base. The upper end of the cylinder F is covered by a cap or sleeve G, to which is secured a rod H, of expansible metal or other material, the same passing through the cylinders B and G, and having its lower end connected with a valve J, whose seat is on the inner face of the cylinder F, near the lower end thereof. The upper end of the rod H is connected with the head 4, to which the cylinders A and B are secured, said rod being screw-threaded for the engagement of a nut 5, whereby the valve J may be adjusted.

In the cylinder F are ports 6, 7, and 8, all of which are uncovered when the trap is in normal condition, the port 8, however, being adapted to be covered by the valve J, as will be hereinafter fully set forth.

The operation is as follows: When hot water enters the chamber B, it passes to the bottom thereof and enters the cylinder F through port 6. As the rod H is expanded by the hot water, the valve J, which is connected with said rod, is moved, whereby it covers the port 8. The hot water now escapes through the port 7, enters the chamber E', and backs up through the ports 1 of the diaphragm D into the chamber C until it reaches the pipe 3, whereby it is discharged. It will be seen that the chamber C is filled with hot water to the line of the opening or pipe 3, whereby the trap is sealed and remains so as long as hot water enters the chamber. When cold water enters the trap, the rod H contracts, whereby the valve is moved so that the port 8 is uncovered. The cold water after entering the chamber E' re-enters the cylinder F through said port 8, and is discharged at the lower end of said cylinder, it being seen that as the cold water is thus discharged freezing of the trap is prevented.

In Fig. 2 the induction-pipe 2 is at the top of the trap, and there is a diaphragm 9 below the same, said diaphragm having ports 10, whereby the water is directed into the cylinder B. The cylinder F is disconnected from the wall around the port 8, leaving a space between said parts, which serves as a port similar to the port 7. The lower end of the rod H serves as a valve for said port 7, the operation, however, being similar to the parts shown in Fig. 1.

In Fig. 3 the cylinder A contains a vertical diaphragm B at one side thereof, leaving the chamber C, which is in communication with the bottom chamber E' by means of the port 1 in the diaphragm D. The rod H has connected with it the valve J, which is hollow or tubular, so as to embrace the cylinder F', which is in the chamber E', disconnected from the cylinder F, and contains the port 8, the operation, however, being similar to the traps shown in Figs. 1 and 2, the water entering the cylinder B, passing into the cylinder F through the port 6, then escaping into the cylinder E, and either backing up into the chamber C or entering the cylinder F, according to the temperature of the water. The cap or sleeve G, which freely embraces the cylinder F, serves to close the upper end of said cylinder F, and has the rod H tightly connected with it.

While I have described several parts as cylinders, they may be of any required shape, as vessels to receive the water directed thereinto.

Having thus described my invention, what I claim as new, and desire to secure by Letters Patent, is—

1. A steam-trap having a water-receiving vessel and bottom and side chambers separated therefrom, a cylinder with ports, and a valve, said ports forming communication between said vessel and the bottom chamber, substantially as described.

2. A steam-trap having a water-receiving vessel, a discharge-chamber, a valve between said chamber and vessel, and a rod of expansible nature connected with said valve, substantially as described.

3. A steam-trap having separate receiving and discharging water-chambers, a valve between the same, a rod of expansible nature controlling said valve, and also simultaneously controlling a second valve regulating a discharge-port at the base of the discharge-chamber, substantially as described.

4. A steam-trap having a discharge-chamber provided with two outlet or eduction openings, one at the base of the chamber and the other at or near the top thereof, a primary receiving-chamber located within said discharge-chamber and communicating therewith by a valve between them, and automatic valve mechanism controlling said lower eduction-opening of the discharge-chamber, substantially as described.

5. A steam-trap having a valve therein, a cylinder with ports, a chamber containing said valve, and a diaphragm between said chamber and the primary receiving-chamber, whereby the water of condensation enters the cylinder through one port, escapes through the other port into said chamber, and is permitted to discharge at the bottom of the trap or above the same, according to the different conditions of temperature of the water, substantially as described.

6. A steam-trap having separate receiving and discharging chambers, the former inclosed within the latter, eduction-openings at the base of both of said chambers, tubular sliding valves covering said openings, respectively, and a rod of expansible nature simultaneously controlling both of said valves, coving and uncovering the eduction-ports thereof, substantially as described.

In testimony whereof I have hereunto affixed my signature this 15th day of January, A. D. 1889.

CHARLES CORNWELL.

Witnesses:
 H. I. FENTON,
 C. W. BECK.